US009026701B2

(12) United States Patent
Finnerty et al.

(10) Patent No.: US 9,026,701 B2
(45) Date of Patent: May 5, 2015

(54) IMPLEMENTING DEVICE SUPPORT IN A WEB-BASED ENTERPRISE APPLICATION

(75) Inventors: Martin Finnerty, Moraga, CA (US); Ming-Tao Liou, Fremont, CA (US); Blair T. Wheadon, North Vancouver (CA); Xia Liu, Belmont, CA (US); Ying-Chieh Lan, Foster City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 48 days.

(21) Appl. No.: 10/748,352

(22) Filed: Dec. 30, 2003

(65) Prior Publication Data

US 2007/0239911 A1    Oct. 11, 2007

(51) Int. Cl.
    G06F 13/12    (2006.01)
    G06F 13/38    (2006.01)
    H04L 29/08    (2006.01)
    H04L 29/06    (2006.01)

(52) U.S. Cl.
    CPC .............. *H04L 67/025* (2013.01); *H04L 69/08* (2013.01); *H04L 69/32* (2013.01)

(58) Field of Classification Search
    USPC .................................................. 710/8, 62, 65
    See application file for complete search history.

(56) References Cited

U.S. PATENT DOCUMENTS

| | | | |
|---|---|---|---|
| 5,155,847 A | 10/1992 | Kirouac et al. | 709/221 |
| 5,367,609 A | 11/1994 | Hopper et al. | 704/278 |
| 5,404,488 A | 4/1995 | Kerrigan et al. | 711/133 |
| 5,862,325 A | 1/1999 | Reed et al. | 709/201 |
| 5,862,377 A | 1/1999 | Lee | 719/329 |
| 5,872,926 A | 2/1999 | Levac et al. | 709/206 |
| 6,272,536 B1 | 8/2001 | van Hoff et al. | 709/217 |
| 6,378,001 B1 | 4/2002 | Aditham et al. | 719/313 |
| 6,389,464 B1 * | 5/2002 | Krishnamurthy et al. | 709/220 |
| 6,421,733 B1 * | 7/2002 | Tso et al. | 709/246 |
| 6,490,519 B1 | 12/2002 | Lapidot et al. | 701/117 |
| 6,587,126 B1 * | 7/2003 | Wakai et al. | 715/744 |
| 7,167,919 B2 * | 1/2007 | Iwamoto et al. | 709/229 |
| 2002/0038289 A1 | 3/2002 | Lawlor et al. | 705/42 |
| 2002/0049603 A1 | 4/2002 | Mehra et al. | 705/1 |
| 2002/0059144 A1 | 5/2002 | Meffert et al. | 705/51 |
| 2002/0161734 A1 | 10/2002 | Stauber et al. | 707/1 |
| 2003/0105955 A1 | 6/2003 | Carroll et al. | 713/156 |
| 2003/0120675 A1 | 6/2003 | Stauber et al. | 707/100 |
| 2004/0030693 A1 * | 2/2004 | Toda | 707/4 |
| 2004/0078373 A1 | 4/2004 | Ghoneimy et al. | 707/10 |
| 2004/0139203 A1 | 7/2004 | Graham et al. | 709/229 |
| 2004/0148409 A1 | 7/2004 | Davis et al. | 709/229 |
| 2004/0216147 A1 | 10/2004 | Yanosy et al. | 719/328 |

\* cited by examiner

*Primary Examiner* — Chun-Kuan Lee
(74) *Attorney, Agent, or Firm* — Campbell Stephenson LLP

(57) ABSTRACT

A method, system, application programming interface, and computer program product that enable enterprise data management application programs to request input/output services from a device manager controlling devices. The device manager operates in a heterogeneous environment including incompatible devices provided by multiple vendors. These requests, and responses from the device manager to the enterprise data management application program, are communicated in a markup language format, rather than in a device-specific native language. This structure enables the vendor of the enterprise data management application program to send requests for services, including both data and instructions to use specialized features of a device, without the need to change the enterprise data management application program to support device-specific native languages.

38 Claims, 11 Drawing Sheets

Directly-Controlled Devices

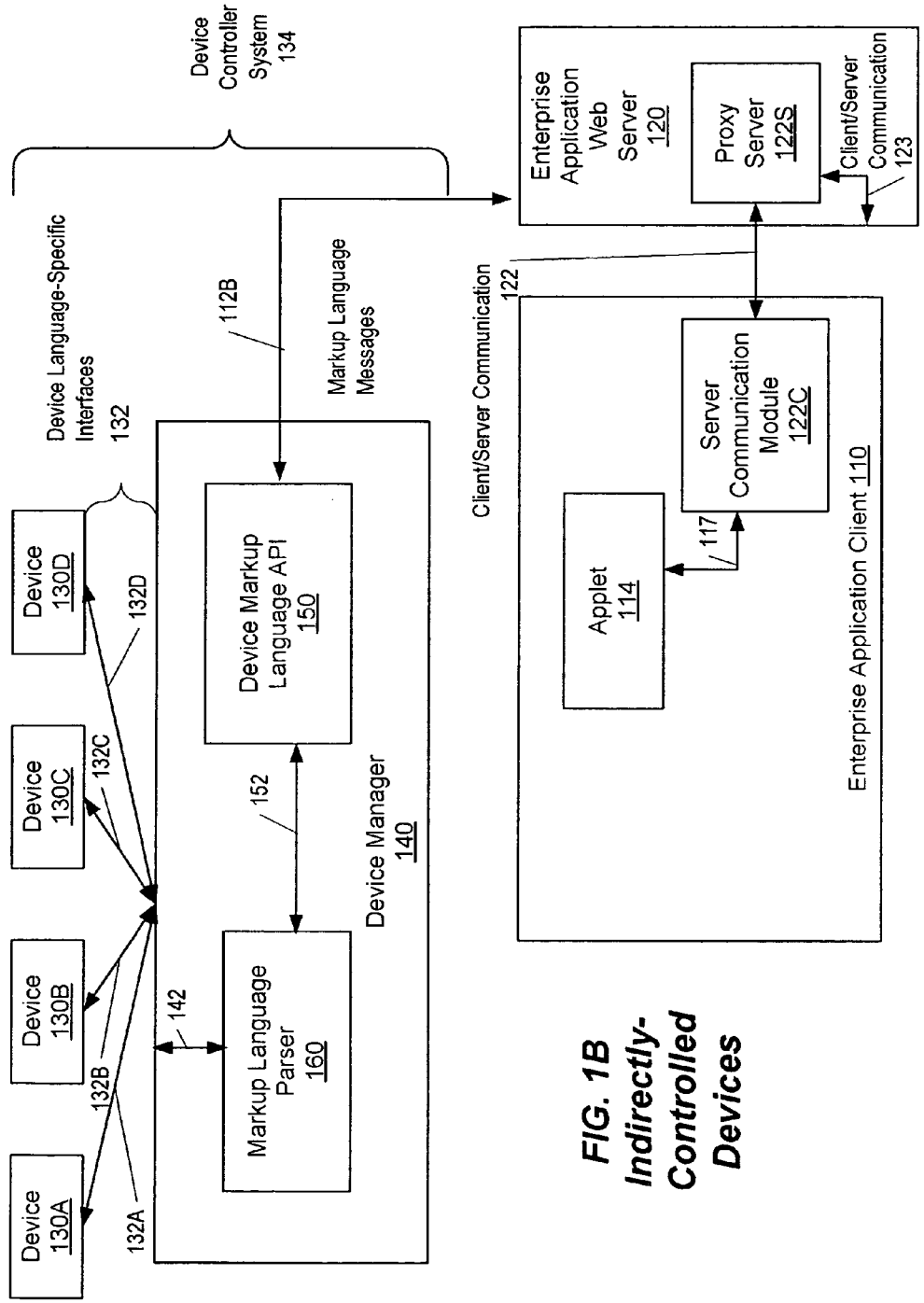
FIG. 1B Indirectly-Controlled Devices

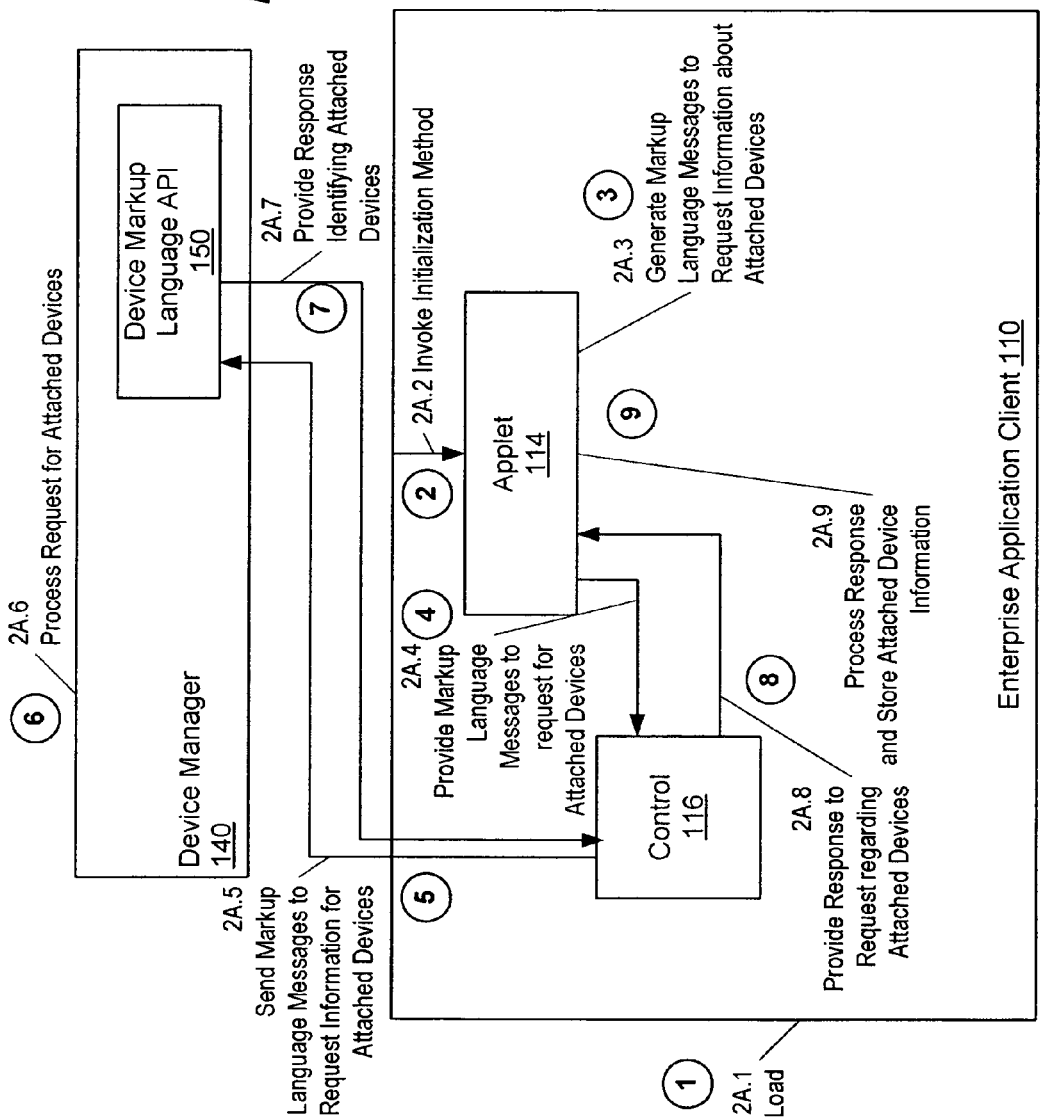

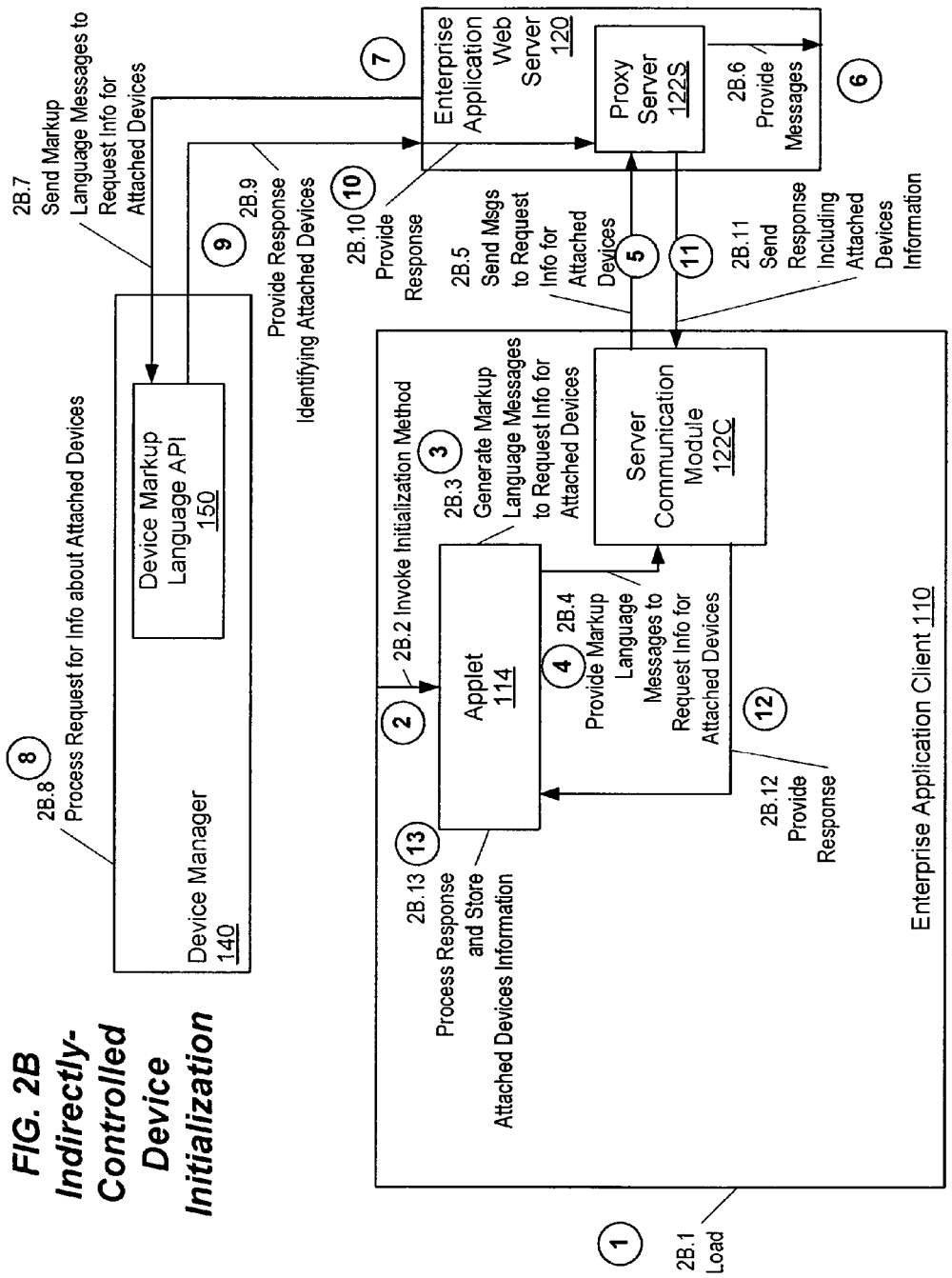

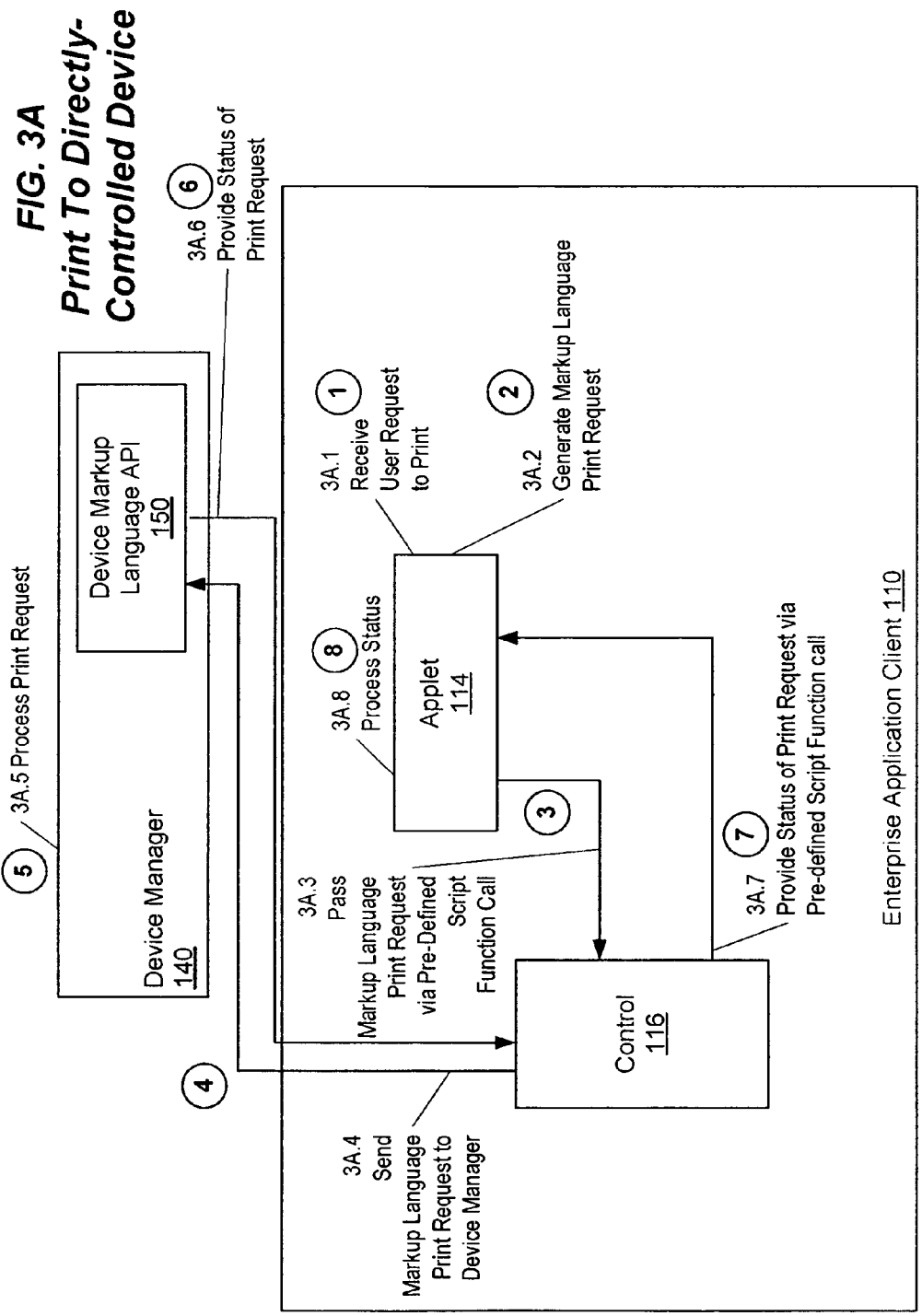

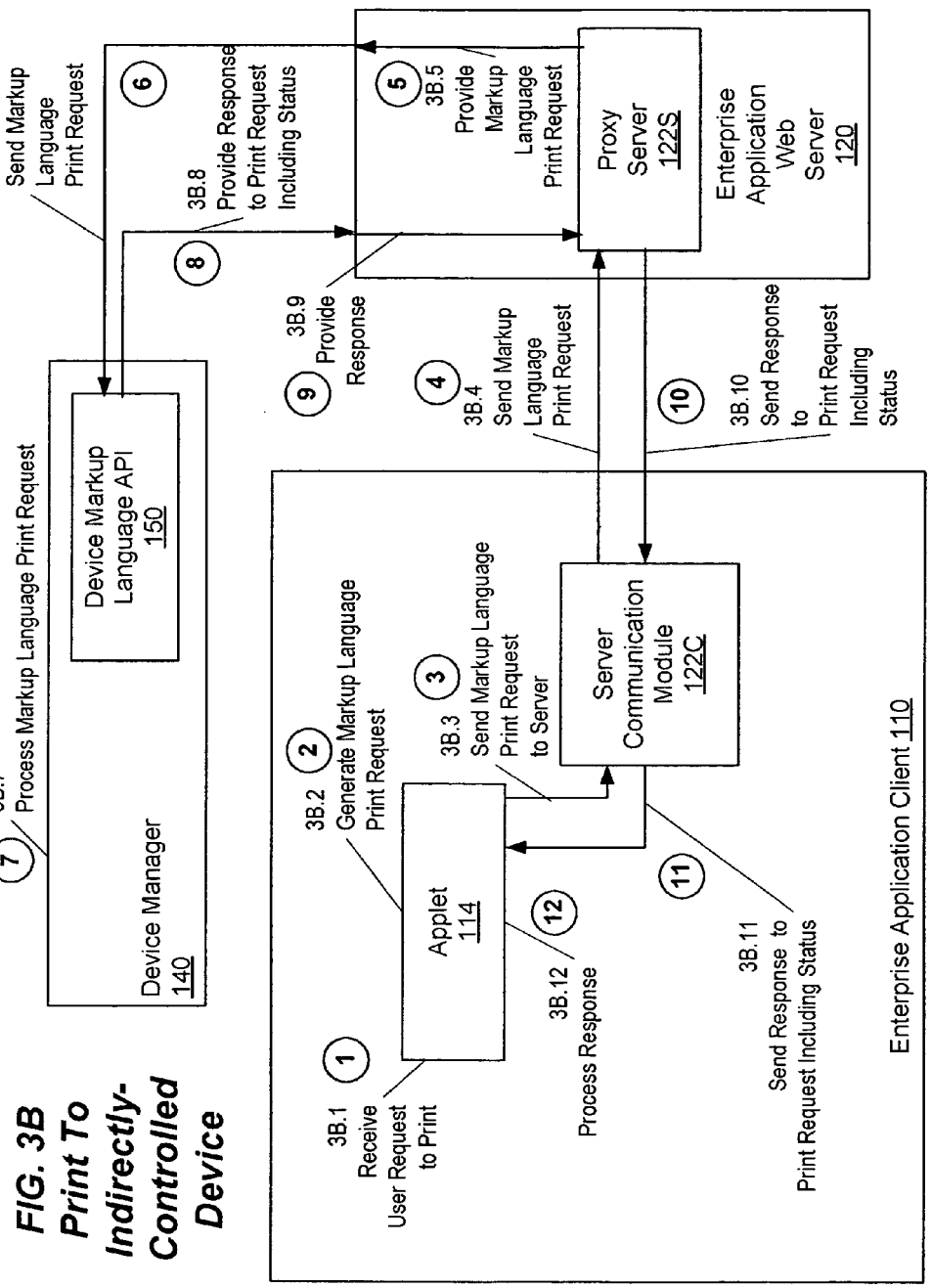
FIG. 3B Print To Indirectly-Controlled Device

Use Case Diagram

```
<deviceRequest>
    <instruction>
        <requestID>request1</requestID>
        <requester>client1</requester>
        <deviceRequest>Printer1</deviceRequest>
        <reponseRequired>Y</reponseRequired>
    </instruction>
    <data>
        <field name="field_name1">field_value1</field>
        <field name="field_name2">field_value2</field>
        ......
        <field name="field_nameN">field_valueN</field>
    </data>
</deviceRequest>
```

Request 510 — Instructions 512, Data 514

FIG. 5A - Device Request

```
<deviceReponse>
    <instructions>
        <requestID>request1</requestID>
        <requester>client1</requester>
    </instructions>
    <data>
        <actionResponse name="print">SUCCESS</actionResponse>
    </data>
</deviceReponse>
```

Response 520 — Instructions 522, Data 524

FIG. 5B - Successful Response

```
<deviceReponse>
  <instructions>
    <requestID>request1</requestID>       Instructions
    <requester>client1</requester>        532
  </instructions>
  <data>
    <actionResponse name="print">ERROR</actionResponse>
    <error>
      <errorNo>ERR_12345</errorNo>        Data
      <message>Printer out of paper</message>  534
    </error>
  </data>
</deviceReponse>
```

Response 530

FIG. 5C - Unsuccessful Response

```
<Event>
  <instructions>
    <eventID>event1</eventID>
    <deviceName>cardSwipeDevice1</deviceName>   Instructions
    <deviceType>cardSwipeDevice</deviceType>    542
    <deviceEvent>cardSwipe</deviceEvent>
    <responseRequired>N</responseRequired>
  </instructions>
  <data>
    <field name="card_number">XXXXXXXXXX</field>   Data
    .....                                           544
  </data>
</Event>
```

Event 540

FIG. 5D - Device Event

IMPLEMENTING DEVICE SUPPORT IN A WEB-BASED ENTERPRISE APPLICATION

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

As businesses increasingly rely on computers for their daily operations, managing the vast amount of business information generated and processed has become a significant challenge. Most large businesses have a wide variety of application programs managing large volumes of data that is entered and/or provided to users via many different types of input/output devices. As an example, in the banking industry, data may be provided using a variety of devices, such as an Automated Teller Machine (ATM) key entry pad, a magnetic card reader, a receipt printer, a passbook reader/writer, and so on. These input/output devices may be available via various types of networks and operating system platforms and often include a variety of devices produced by many different vendors. Each device typically is incompatible with the devices of other vendors.

Often, vendors of input/output devices provide their own application programming interfaces (APIs, sometimes referred to as application program interfaces) and/or command line utilities for using the specialized features of their own input/output devices, but these APIs and command line utilities are not compatible from vendor to vendor. Instead, these APIs and command line utilities typically communicate in a device-specific native language. Furthermore, device communication standards have not been widely adopted, adding to the incompatibility problem.

One approach to communicating with a wide variety of types of devices is to modify an enterprise data management application that uses the features of these devices to communicate in the device-specific native language for each device. For example, to add a new type of input/output device to an enterprise data management system environment, the enterprise data management application often must be modified to call the device-specific APIs in addition to adding a new device driver or modifying an existing device driver. The software using the new device is tested by enterprise data management application vendor personnel and incorporated into a later release of the enterprise data management application.

This process for making new devices available has proven costly for vendors of enterprise data management applications, as support for each new type of device requires a new release, a costly and time-consuming project. Furthermore, the release process has proven untimely for the vendors of devices, as support for their products depends upon the release schedules for enterprise data management applications in which their products are used, slowing time to market for their devices. Typically, enterprise data management application vendors are not device vendors and would prefer a platform- and device-independent mechanism to request input/output services.

Another approach to simplify communication with a variety of different devices is provided by the Microsoft Windows Driver Model (WDM). WDM was introduced to allow driver developers to write device drivers that are source-code compatible across all Microsoft Windows operating systems. A Windows driver acts as an intermediary between an application program and a device driver. A Windows driver API is pre-defined to receive calls from application programs for services, and the Windows driver determines the appropriate device to provide the service and communicates with the selected device in that device's native language.

The Windows Driver Model, however, has failed to provide the flexibility needed by enterprise data management applications. Because the WDM API is pre-defined, all features provided by each device may not be supported. In addition, most API calls do not provide optional variables that can be set to take advantage of a particular device's features, and no mechanism exists to easily modify messages sent to the WDM API. As a result, it may not be possible to take advantages of the particular features of a device without using the device-specific native language.

What is needed is the ability to dynamically add or modify support for a device in an enterprise data management application without the need to modify the enterprise data management application to communicate with the device.

SUMMARY OF THE INVENTION

The present invention relates to a method, system, application programming interface, and computer program product that enable enterprise data management application programs to request input/output services from a device manager controlling devices. The device manager operates in a heterogeneous environment including incompatible devices provided by multiple vendors. These requests for services, and responses from the device manager to the enterprise data management application program, are communicated in a markup language format, rather than in a device-specific native language.

An application programming interface is provided to communicate with the device manager in the markup language format. This structure enables the vendor of the enterprise data management application program to send requests for services, including both data and instructions to use specialized features of a device, without the need to change the enterprise data management application program to support device-specific native languages. The device manager can be easily modified to support new devices by adding new API commands to support specific features of those devices.

One feature of the invention includes a method for obtaining a request to provide a service, wherein the request conforms to a request format defined in a first language, such as a markup language. At least one device of a plurality of devices provides the service, and the method further includes identifying one of the devices to provide the service. The method further includes converting the request to a second request in a second language, such as a device-specific native language, wherein the second language is used for communication with the one device. The method further includes directing the second request to the one device.

BRIEF DESCRIPTION OF THE DRAWINGS

The present invention may be better understood, and its numerous objectives, features, and advantages made apparent to those skilled in the art by referencing the accompanying drawings.

FIG. 1B shows an example of a system including an enterprise application client indirectly communicating with a language-independent device manager in control of devices via an intermediary enterprise application web server.

FIG. 2A shows an example of an initialization process in the system of FIG. 1A.

FIG. 2B shows an example of an initialization process in the system of FIG. 1B.

FIG. 3A shows an example of a print process in the system of FIG. 1A.

FIG. 3B shows an example of a print process in the system of FIG. 1B.

FIG. 5A shows an example of a markup language request sent to the device manager of FIG. 1A or 1B for services provided by a device.

FIG. 5B shows an example of a markup language response sent by the device manager of FIG. 1A or 1B to a request for services, such as the request of FIG. 5A.

FIG. 5C shows an example of a markup language response indicating that the request for services was unsuccessful.

FIG. 5D shows an example of a markup language event occurring with respect to one of the devices providing input/output services.

The use of the same reference symbols in different drawings indicates similar or items.

DETAILED DESCRIPTION

Figure 1A:
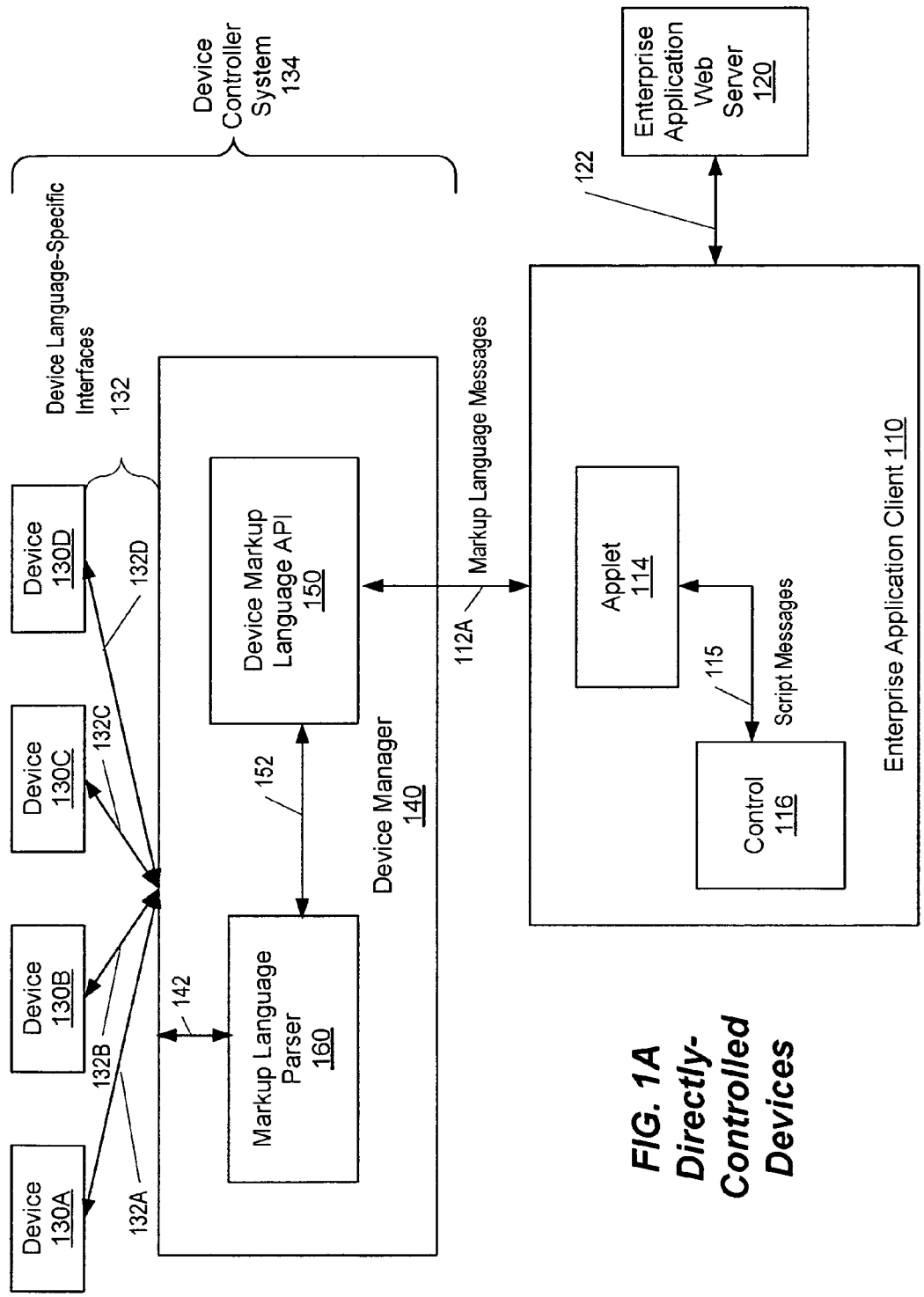
FIG. 1A shows an example of a system including an enterprise application client directly communicating with a language-independent device manager in control of devices.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

TERMINOLOGY

Communication with a device commonly involves use of a dynamic link library (DLL). A DLL is a collection of programs, any of which can be called when needed by another program that is running in the computer. A particular DLL program that enables the calling program to communicate with a specific device, such as a printer or scanner, is often packaged as a DLL file. DLL files that support specific device operation are known as device drivers.

The advantage of DLL files is that, because they are not loaded into random access memory (RAM) together with the main program, space is saved in RAM. When and if a DLL file is needed, then it is loaded and run. For example, as long as a user of Microsoft Word is editing a document, the printer DLL file does not need to be loaded into RAM. If the user decides to print the document, then the Word application causes the printer DLL file to be loaded and run.

As mentioned previously, typically device vendors will provide an application program interface (API) to communicate with a specific device. An API is the specific method prescribed by a computer operating system or by an application program by which a programmer writing an application program can make requests of the operating system or another application. An API can be contrasted with a graphical user interface or a command interface (both of which are direct user interfaces) as interfaces to an operating system or a program.

The term 'markup language' is used herein to describe a text-based language in which information can be encoded using structural features such as tags. SGML (Standard Generalized Markup Language) is one example of a standard for specifying a document markup language or tag set. Such a specification is itself a document type definition (DTD). SGML is not in itself a document language, but a description of how to specify one. SGML is metadata.

SGML is based on the idea that documents have structural and other semantic elements that can be described without reference to how such elements should be displayed. The actual display of such a document may vary, depending on the output medium and style preferences. Some advantages of documents based on SGML are:

Documents can be created by thinking in terms of document structure rather than appearance characteristics (which may change over time).

Documents are more portable because an SGML compiler can interpret any document by reference to the document's document type definition (DTD).

Documents originally intended for the print medium can easily be re-adapted for other media, such as the computer display screen.

The language that web browsers use, Hypertext Markup Language (HTML), is an example of an SGML-based language. There is a document type definition for HTML (and reading the HTML specification is effectively reading an expanded version of the document type definition). The markup languages described herein are not limited to SGML-based markup languages or HTML. The markup languages described herein need only provide the capability to define structure of the information in the document.

Introduction

The present invention relates to a method, system, application programming interface, and computer program product that enable enterprise data management application programs to request input/output services from a device manager controlling devices. The device manager operates in a heterogeneous environment including incompatible devices provided by multiple vendors. These requests, and responses from the device manager to the enterprise data management application program, are communicated in a markup language format, rather than in a device-specific native language. This structure enables the vendor of the enterprise data management application program to send requests for services, including both data and instructions to use specialized features of a device, without the need to change the enterprise data management application program to support device-specific native languages.

FIG. 1A shows an example of a system including an enterprise application client 110 in communication with an enterprise application web server 120 via communication link 122. Enterprise application client 110 uses input/output services provided by devices 130, with device 130A, device 130B, device 130C, and device 130D shown as representative devices. Each of devices 130A, 130B, 130C, and 130D has a respective device language-specific interface 132A, 132B, 132C, and 132D. These device language-specific interfaces 132 may be, for example, device native APIs. Enterprise application client 110 directly communicates with a language-independent device manager 140 in control of devices 130 to request input/output services. Devices 130, device language-specific interfaces 132, and device manager 140 form device controller system 134.

Device manager 140 can be considered to be language-independent because requests for input/output services are communicated by enterprise application client 110 using markup language messages, rather than the native languages for devices. These markup language messages can be communicated, for example, via Remote Procedure Calls (RPC) between computers on a network, Component Object Model (COM) method calls, or by direct API calls, as shown by communication 112A between enterprise application client 110 and device markup language API 150. Device manager may be implemented, for example, as a servlet program, as part of an enterprise application, or using other techniques known in the art. Within device manager 140, device markup language API 150 is an interface for receiving and sending messages in a markup language format. Once received by device manager 140 via device manager language API 150, these markup language messages can be provided via communication 152 to markup language parser 160. Markup language parser 160 parses the markup language message and provides the results to device manager 140, as shown by communication 142.

The results provided by markup language parser 160 are used by device manager 140 to communicate with devices 130 using respective device-specific native language(s) for each of devices 130, as represented by device language-specific interfaces 132. Each of device language-specific interfaces 132 can be considered to correspond to a dynamic link library (DLL) for a respective one of devices 130.

Enterprise application client 110 includes an applet 114 that is downloaded from enterprise application web server 120 to run within a browser program (not shown) used for Internet communication. Applet 114 can generate markup language messages to communicate with device manager 140, such as markup language messages to request input/output services on behalf of enterprise application client 110. In one embodiment, applet 114 is implemented as a Java applet, although applet 114 represents any type of program that can be used by enterprise application client 110 to allow a user (person or another program) to request services.

Enterprise application client 110 also includes control 116, which is a control program that can run outside a browser program (not shown) in which applet 114 executes. For example, control 116 may send markup language messages generated by applet 114 to device manager 140. Control 116 may have access privileges for accessing the client computer system (not shown) on which enterprise application client 110 runs, whereas applet 114 may not. For example, control 116 may be able to access client computer system resources to identify an address for device manager 140, whereas an applet typically cannot obtain such information. Applet 114 and control 116 can communicate via script messages, as shown by communication 115. The use of applet 114 and control 116 is one example of an implementation of enterprise application client 110, but the invention is not limited to such an implementation. Any implementation in which an enterprise application client, such as enterprise application client 110, can communicate with a language-independent device manager, such as device manager 140, is within the scope of the invention. Another example implementation of enterprise application client 110 is provided in FIG. 1B, as described below.

FIG. 1B shows an example of a system including an enterprise application client indirectly communicating with a language-independent device manager in control of devices via an intermediary enterprise application web server. The functionality of enterprise application client 110, devices 130, and device manager 140 is essentially the same as described with reference to FIG. 1A. However, in this embodiment, enterprise application client 110 sends requests for input/output services via enterprise application web server 120 rather than directly to device manager 140. Instead of having a control program with access privileges on the client computer system running enterprise application client 110, applet 114 communicates markup language messages, as shown by communication 117, to server communication module 122C.

Server communication module 122C communicates with proxy server 122S via communication link 122. Communication via communication link 122 can be implemented using RPC, COM, hypertext transfer protocol (HTTP), or other communication protocols. Proxy server 122S in turn provides messages, as shown in client/server communication 123, to enterprise application web server 120. Communication 123 can be accomplished, for example, using direct API calls, COM, or other inter-process communication techniques. Enterprise web application web server 120 then communicates markup language messages to device manager 140 via device markup language API 150, as shown in communication 112B. Communication 112B can be accomplished using RPC, COM, or direct API calls.

While FIG. 1B shows enterprise application client 110 as generating a request for service from device manager 140, it is possible that enterprise application server 120 may recognize the need to generate a request for service without enterprise application client 110 making the request. Enterprise application server 120 can then generate and send the appropriate markup language messages to make the request.

FIG. 2A shows an example of an initialization process in the system of FIG. 1A, where enterprise application client 110 communicates directly with device manager 140. Encircled guide numbers are provided in FIGS. 2A through 3B to aid the reader. In action 2A.1, enterprise application client 110 is loaded. In action 2A.2, enterprise application client 110 invokes an initialization method, which initializes applet 114. In action 2A.3, applet 114 generates markup language messages to request device manager 140 for information about attached devices that are available for use by enterprise application client 110. In action 2A.4, applet 114 provides the markup language messages to request information about attached devices to control 116. Control 116 may have an API with which applet 114 must communicate, and applet 114 may need to process the markup language messages into a format that is compatible with the API for control 116. If an API for control 116 exists, control 116 converts the messages from the API format into the markup language message format for communication to device manager 140.

As noted above, control 116 has the ability to determine the address of device manager 140 and to communicate messages to device manager 140 on behalf of applet 114. This communication can be accomplished in several ways. For example, control 116 may send a message directly to device manager 140 using the address. Alternatively, control 116 may place a message into a queue that is periodically checked by device manager 140 to obtain messages, and device manager 140 may obtain the message from the queue. Other ways of communicating messages between enterprise application client 110 and device manager 140 are also within the scope of the invention.

In action 2A.5, control 116 sends the markup language messages generated by applet 114 to device manager 140 by calling a function of device markup language API 150. In action 2A.6, device manager 140 processes the request for information about attached devices. Processing the request may involve providing the markup language messages to markup language parser 160 of FIG. 1A (not shown here), obtaining the results of parsing the markup language messages, and initiating communication with devices 130 (not shown) via device language-specific interfaces 132 to identify the available attached devices. In action 2A.7, device manager 140 uses device markup language API 150 to provide a response to the request for information about attached devices to control 116. In action 2A.8, control 116 provides the response received from device manager 140 to applet 114. In action 2A.9, applet 114 processes the response and stores the attached device information for use in future input/output service requests.

FIG. 2B shows an example of a similar initialization process in the system of FIG. 1B, where enterprise application client 110 communicates indirectly with device manager 140 via enterprise application web server 120. In action 2B.1, enterprise application client 110 is loaded. In action 2B.2, enterprise application client 110 invokes an initialization method, which initializes applet 114. In action 2B.3, applet 114 generates markup language messages to request device manager 140 for information about attached devices that are available for use by enterprise application client 110. Up until this point, all actions performed by enterprise application client 110 are the same as those described with reference to FIG. 1A. However, in action 2B.4, applet 114 provides the markup language messages to request information about attached devices to server communication module 122C rather than to a control, such as control 116 of FIG. 2B. Server communication module 122C may provide Remote Procedure Call (RPC) services, COM services, or other types of services for communication with enterprise application web server 120.

In action 2B.5, server communication module 122C sends the markup language messages generated by applet 114 to proxy server 122S, which provides corresponding RPC, COM, or other communication services to communicate with server communication module 122C. In action 2B.6, proxy server 122S provides the messages received to enterprise application web server 120. In action 2B.7, enterprise application web server 120 sends the markup language messages to device manager 140 by calling a function of device markup language API 150. In action 2B.8, device manager 140 processes the request for information about attached devices. Processing the request may involve providing the markup language messages to markup language parser 160 of FIG. 1B (not shown here), obtaining the results of parsing the markup language messages, and initiating communication with devices 130 (not shown) via device language-specific interfaces 132 to identify the available attached devices.

In action 2B.9, device manager 140 uses device markup language API 150 to provide a response to the request for information about attached devices to enterprise application web server 120. In action 2B.10, enterprise application web server 120 provides the response received from device manager 140 to proxy server 122S. In action 2B.11, proxy server 122S sends the response including the attached devices information to server communication module 122C within enterprise application client 110. In action 2B.12, server communication module 122C provides the response to the original requester, applet 114. In action 2B.13, applet 114 processes the response and stores the attached device information for use in future input/output service requests.

FIG. 3A shows an example of a print process in the system of FIG. 1A, where enterprise application client 110 communicates directly with device manager 140. In action 3A.1, applet 114 receives a user request to print. The user request is typically provided via another program, such as a user interface for enterprise application client 110, that constructs the request in accordance with device language markup API. However, it is within the scope of the invention that a user provides the request via a command line interface. In action 3A.2, applet 114 generates a markup language print request to request printing services from device manager 140. In action 3A.3, applet 114 provides the markup language print request to control 116 via a pre-defined script function call.

In action 3A.4, control 116 sends the markup language print request generated by applet 114 to device manager 140 by calling a function of device markup language API 150. In action 3A.5, device manager 140 processes the print request. Processing the print request may involve providing the print request to markup language parser 160 of FIG. 1A (not shown here), obtaining the results of parsing the print request, selecting a device of devices 130 of FIG. 1A (not shown here) to fulfill the print request, translating the print request into a native language for the selected device, and initiating communication with the selected device (not shown) via that device's respective device language-specific interfaces 132 to communicate the print request.

In action 3A.6, device manager 140 uses device markup language API 150 to provide a response to the print request to control 116. The response to the print request may include a status of whether the print request was successfully completed. In action 3A.7, control 116 provides the response received from device manager 140 to applet 114 via a pre-defined script function call. In action 3A.8, applet 114 processes the response including the status of the print request. For example, if the response indicates that the print request was unsuccessful, applet 114 may send another print request to device manager 140.

FIG. 3B shows an example of a print process in the system of FIG. 1B, where enterprise application client 110 communicates indirectly with device manager 140 via enterprise application web server 120. In action 3B.1, applet 114 receives a user request to print. In action 3B.2, applet 114 generates a markup language print request to request printing services from device manager 140. In action 3B.3, applet 114 provides the markup language print request to server communication module 122C.

In action 3B.4, server communication module 122C sends the markup language print request generated by applet 114 to proxy server 122S. In action 3B.5, proxy server 122S provides the markup language print request to enterprise application web server 120. Enterprise application web server 120 then sends the markup language print request to device manager 140 by calling a function of device markup language API 150 in action 3B.6. In action 3B.7, device manager 140 processes the markup language print request. Processing the print request may involve providing the print request to markup language parser 160 of FIG. 1B (not shown here), obtaining the results of parsing the print request, selecting a device of devices 130 of FIG. 1B (not shown here) to fulfill the print request, translating the print request into a native language for the selected device, and initiating communication with the selected device (not shown) via that device's respective native API of device language-specific interfaces 132 to communicate the print request.

In action 3B.8, device manager 140 uses device markup language API 150 to provide a response to the print request to enterprise application web server 120. The response to the print request may include a status of whether the print request was successfully completed. In action 3B.9, proxy server 122S obtains the response from enterprise application web server 120. In action 3B.10, proxy server 122S provides the response received from device manager 140 to server communication module 122C within enterprise application client 110. In action 3B.11, enterprise application client 110 sends the response to the print request, including the status, to applet 114. In action 3B.12, applet 114 processes the response including the status of the print request. For example, if the response indicates that the print request was unsuccessful, applet 114 may send another print request to device manager 140.

In the examples described above with reference to FIGS. 2A through 3B, device manager 140 performs several functions and can be considered to serve as a module, means, or instructions for performing each of those functions. For example, device manager 140 obtains a request to provide a service from enterprise application client 110 and can be considered to be an obtaining module, means, and/or instructions. Device manager 140 also performs the functions of identifying or selecting one device to provide the service; converting the request to a second request in a second language, wherein the second language is a device-specific native language used for communication with the one device; and directing the second request to the one device.

Figure 4:
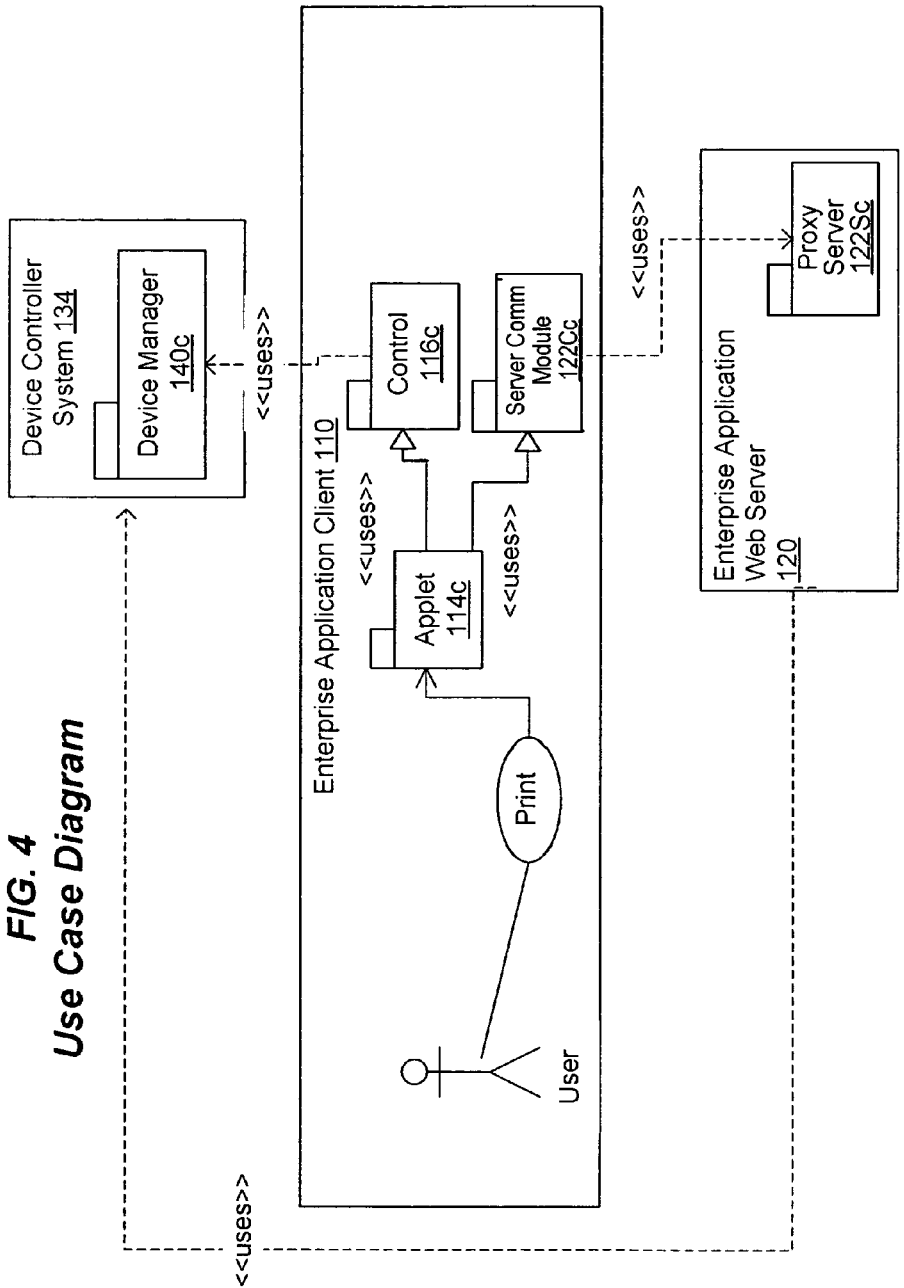
FIG. 4 is a use case diagram for the example systems shown in FIGS. 1A and 1B.

FIG. 4 is a use case diagram for the example systems shown in FIGS. 1A and 1B. In this example, the user requests to print a document. Classes for objects involved in processing the print request are shown, with a lower-case 'c' used at the end of the reference numeral from FIG. 1A or 1B to indicate that a class providing a description for a related object is depicted. For example, the class for applet 114 is shown as applet 114c, and the class for control 116 is shown as control 116c. The print request is obtained by an object, such as applet 114, which instantiates applet class 114c within enterprise application client 110.

Objects instantiating applet class 114c can be configured to use objects instantiating a control class, such as control 116 instantiating control class 116c, and/or objects instantiating a server communication module class, such as server communication module 122C instantiating server communication module class 122Cc. Objects instantiating control class 116c can be configured to communicate with a device manager object, such as device manager 140 instantiating a device manager class 140c, using device markup language API 150 (not shown). By having access to an object instantiating device manager class 140c, an object instantiating control class 116c can communicate with device controller system 134 and device language-specific interfaces 132 to access devices 130. Server communication module class 122Cc is configured to use a proxy server object, instantiating proxy server class 122Sc.

The markup language messages communicated between objects can be considered to include a header, made up of instructions, and a payload, which includes data upon which the instructions are to be performed. Markup language messages can be configured to use specific features of particular devices by specifying an optional variable in the instructions and providing a value for the optional variable in the payload. Device markup language API 150 of FIGS. 1A and 1B can define a messaging protocol for communicating with device manager 140. For example, device markup language API 150 can include a request definition for a command providing a request for service to device manager 140, a response definition for a response format in which a response to the request is provided, and an initialization command for initializing prior to providing a request for service.

By providing a markup language message format, clients of device manager 140 can provide the optional variables and values as part of a configurable request. Markup language parser 160 can be configured to recognize those optional variables, and device manager 140 can convert the request to a device language-specific interface commands. Applications can take advantage of special features provided by a specific device without the need to modify source code of the applications.

FIGS. 5A through 5D show examples of different types of markup language messages used for communication within the system described herein. FIG. 5A shows an example of a request 510 sent to the device manager 140 of FIG. 1A or 1B for services provided by a device, such as one of devices 130. Request 510 is delimited by the <deviceRequest> and </deviceRequest> tags at the top and bottom of request 510. Request 510 includes instructions 512, delimited by the <instruction> and </instruction> tags, and data 514, delimited by the <data> and </data> tags. In this example, instructions 512 specify four parameters: a request 1D, delimited by the <requestID> and </requestID> tags and having a value of 'request1;' a requester, delimited by the <requester> and </requester> tags and having a value of 'client1;' a device request, delimited by the <deviceRequest> and </deviceRequest> tags and having a value of 'Printer1;' and response required, delimited by the <responseRequired> and </responseRequired> tags and having a value of 'Y.' Data 514 provides names and values for N data fields upon which the request is to be performed.

FIG. 5B shows an example of a successful response sent by device manager 140 of FIG. 1A or 1B to a request for services, such as request 510 of FIG. 5A. Response 520 is delimited by the <deviceResponse> and </deviceResponse> tags at the top and bottom of response 520. Response 520 includes instructions 522, delimited by the <instruction> and </instruction> tags, and data 524, delimited by the <data> and </data> tags. In this example, instructions 522 specify two parameters: a request ID for a request to which the response applies, delimited by the <requestID> and </requestID> tags and having a value of 'request1;' and a requester to whom the response is to be provided, delimited by the <requester> and </requester> tags and having a value of 'client1.' Data 524 provides a name of a function, "print," and a value for an actionResponse data field, "SUCCESS," indicating that "SUCCESS" should be printed.

FIG. 5C shows an example of an unsuccessful response sent by device manager 140 of FIG. 1A or 1B to a request for services, such as request 510 of FIG. 5A. Response 530 is delimited by the <deviceResponse> and </deviceResponse> tags at the top and bottom of response 530. Response 530 includes instructions 532, delimited by the <instruction> and </instruction> tags, and data 534, delimited by the <data> and </data> tags. In this example, instructions 532 specify two parameters: a request ID for a request to which the response applies, delimited by the <requestID> and </requestID> tags and having a value of 'request1;' and a requester to whom the response is to be provided, delimited by the <requester> and </requester> tags and having a value of 'client1.' Data 534 provides a name of a function, "print," and a value for an actionResponse data field, "ERROR," indicating that "ERROR" should be printed. Data 534 further includes error information, including an error number field, delimited by the <errorNo> and </errorNo> tags and having a value of ERR_12345, and a message, delimited by the <message> and </message> tags and having a value of "Printer out of paper."

FIGS. 5A through 5C have described the markup language format for requests and responses sent between enterprise application client 110 and device manager 140. However, not all communication between device manager 140 and devices 130 is initiated by the enterprise application client 110. For example, data may be entered by swiping a card through a magnetic card reader device. When device manager 140 detects that a card swipe event has occurred, device manager 140 encodes the event as a markup language message. Applications can register with device manager 140 to receive notification of particular events of interest.

FIG. 5D shows an example of a device event 540. Event 540 is delimited by the <Event> and </Event> tags at the top and bottom of event 540. Event 540 includes instructions 542, delimited by the <instruction> and </instruction> tags, and data 544, delimited by the <data> and </data> tags. In this example, instructions 542 specify five parameters: an event ID for the event, delimited by the <eventID> and </eventID> tags and having a value of 'event1;' a device name, delimited by the <deviceName> and </deviceName> tags and having a value of 'deviceName;' a device type, delimited by the <deviceType> and </deviceType> tags and having a value of 'cardSwipeDevice1;' a device event, delimited by the <deviceEvent> and </deviceEvent> tags and having a value of 'cardSwipe;' and response required, delimited by the <responseRequired> and </responseRequired> tags and having a value of 'N.' Data 544 provides a name for a card number field, "card_number," and a value for the card number field, 'XXXXXXXXXX.'

The above-described embodiments of the invention can be implemented in a variety of computing and networking environments. An example networking environment in which the present invention can operate is described below with reference to FIG. 6, and an example computing environment that can be used to implement the invention is described below with reference to FIG. 7.

An Example Networking and Computing Environment

Figure 6:
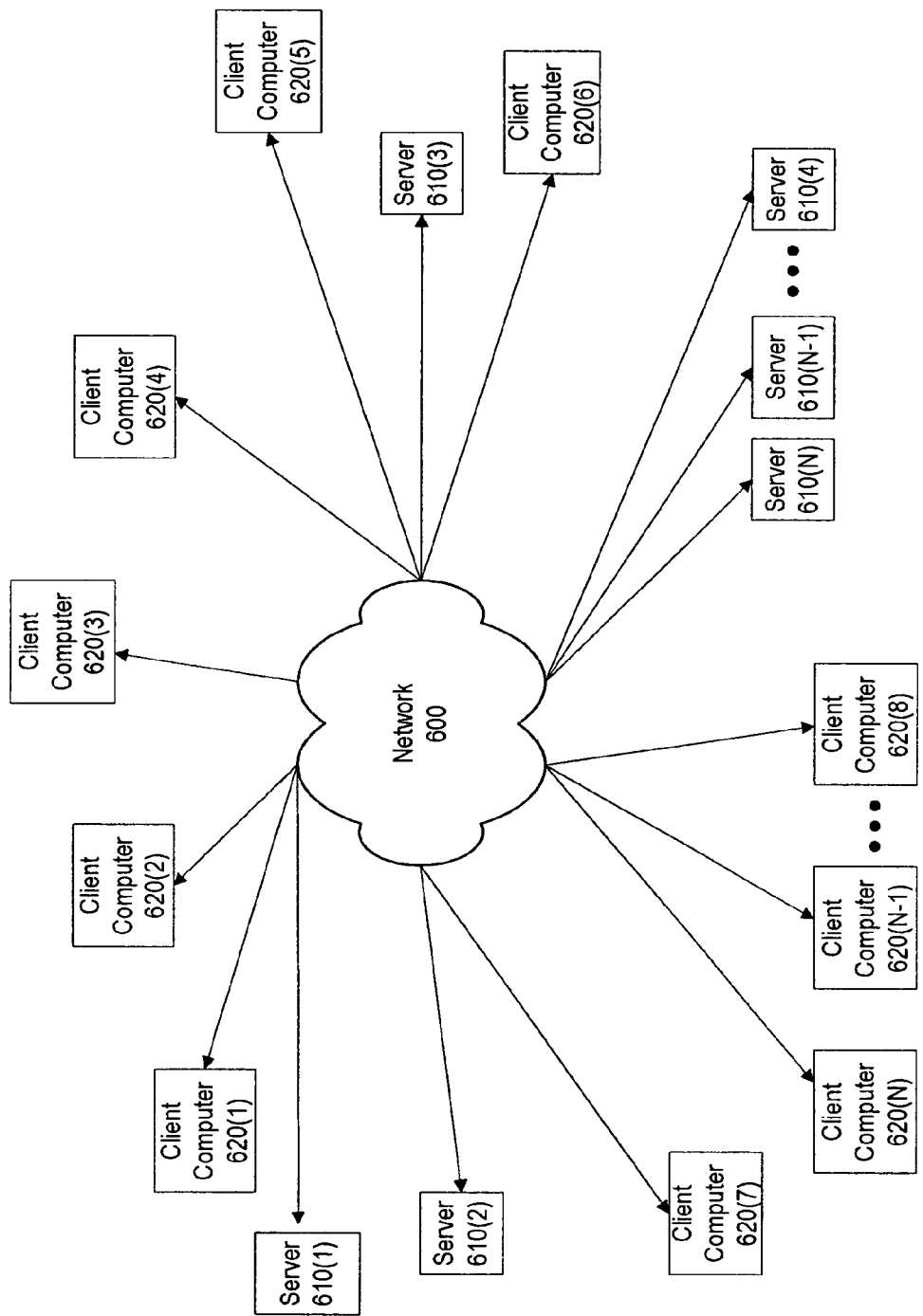
FIG. 6 is an example of a network environment in which the present invention can operate.

FIG. 6 is a block diagram illustrating a network environment in which a system according to the present invention may be practiced. As is illustrated in FIG. 6, network 600, such as a private wide area network (WAN) or the Internet, includes a number of networked servers 610(1)-(N) that are accessible by client computers 620(1)-(N). Communication between client computers 620(1)-(N) and servers 610(1)-(N) typically occurs over a publicly accessible network, such as a public switched telephone network (PSTN), a DSL connection, a cable modem connection or large bandwidth trunks (e.g., communications channels providing T1 or OC3 service) or wireless link. Client computers 620(1)-(N) access servers 610(1)-(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 620(1)-(N).

One or more of client computers 620(1)-(N) and/or one or more of servers 610(1)-(N) may be, for example, a computer system of any appropriate design, in general, including a mainframe, a mini-computer or a personal computer system. One such example computer system, discussed in terms of client computers 620(1)-(N), is shown in detail in FIG. 7.

Figure 7:
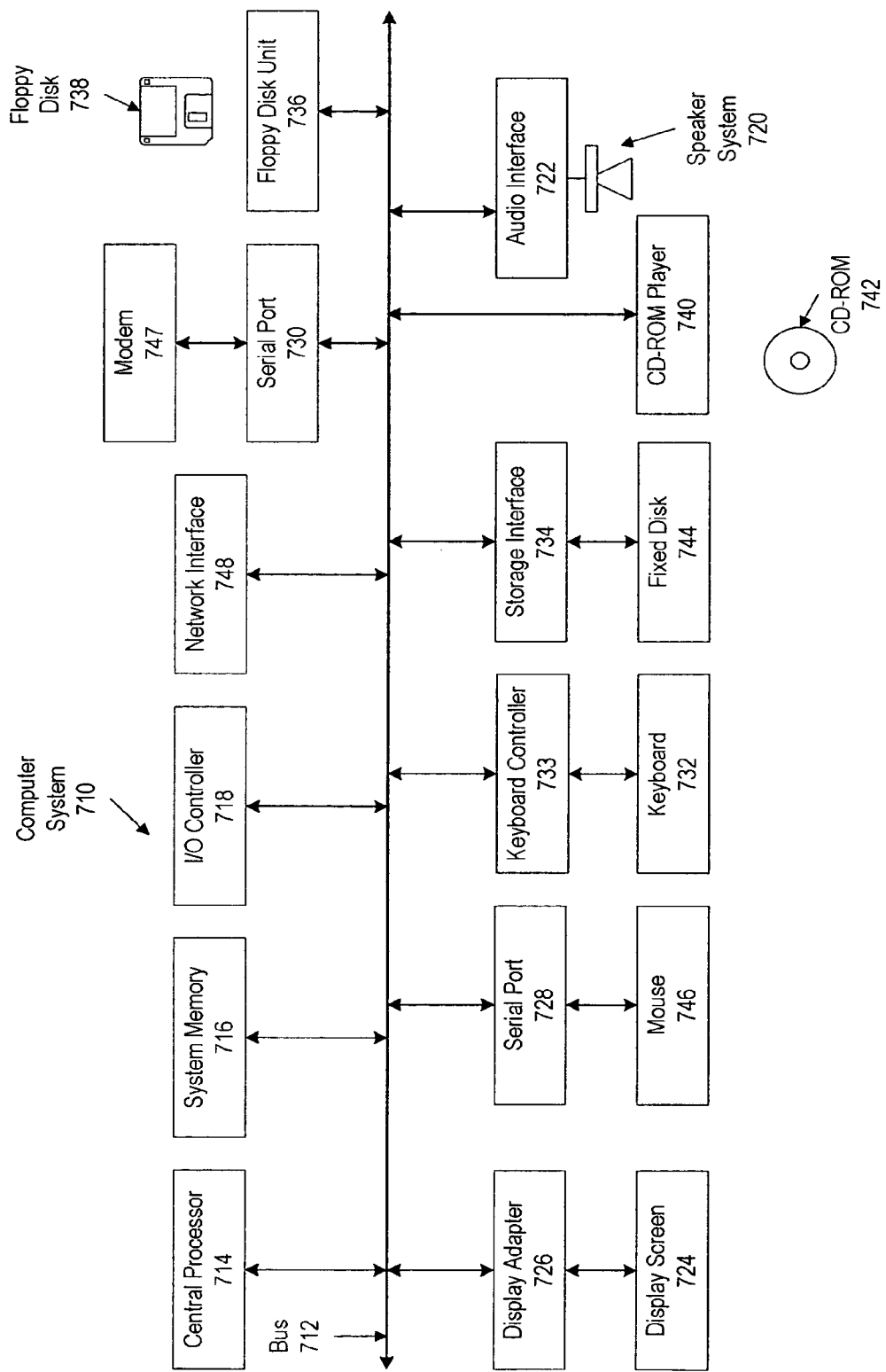
FIG. 7 is an example configuration of a computer system that can be used to operate the present invention.

FIG. 7 depicts a block diagram of a computer system 710 suitable for implementing the present invention, and as an example of one or more of client computers 620(1)-(N) of FIG. 6. Computer system 710 includes a bus 712 which interconnects major subsystems of computer system 710 such as a central processor 714, a system memory 716 (typically RAM, but which may also include ROM, flash RAM, or the like), an input/output controller 718, an external audio device such as a speaker system 720 via an audio output interface 722, an external device such as a display screen 724 via display adapter 726, serial ports 728 and 730, a keyboard 732 (interfaced with a keyboard controller 733), a storage interface 734, a floppy disk drive 736 operative to receive a floppy disk 738, and a CD-ROM drive 740 operative to receive a CD-ROM 742. Also included are a mouse 746 (or other point-and-click device, coupled to bus 712 via serial port 728), a modem 747 (coupled to bus 712 via serial port 730) and a network interface 748 (coupled directly to bus 712).

Bus 712 allows data communication between central processor 714 and system memory 716, which may include both read only memory (ROM) or flash memory (neither shown), and random access memory (RAM) (not shown), as previously noted. The RAM is generally the main memory into which the operating system and application programs are loaded and typically affords at least 64 megabytes of memory space. The ROM or flash memory may contain, among other code, the Basic Input-Output system (BIOS) which controls basic hardware operation such as the interaction with peripheral components. Applications resident with computer system 710 are generally stored on and accessed via a computer readable medium, such as a hard disk drive (e.g., fixed disk 744), an optical drive (e.g., CD-ROM drive 740), floppy disk unit 736 or other storage medium. Additionally, applications may be in the form of electronic signals modulated in accordance with the application and data communication technology when accessed via network modem 747 or interface 748.

Storage interface 734, as with the other storage interfaces of computer system 710, may connect to a standard computer readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, general packet radio service (GPRS) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 7 to be present to practice the present invention. The devices and subsystems may be interconnected in different ways from that shown in FIG. 7. The operation of a computer system such as that shown in FIG. 7 is readily known in the art and is not discussed in detail in this application. Code to implement the present invention may be stored in computer-readable storage media such as one or more of system memory 716, fixed disk 744, CD-ROM 742, or floppy disk 738. Additionally, computer system 710 may be any kind of computing device, and so includes personal data assistants (PDAs), network appliances, X-window terminals or other such computing devices. Computer system 710 also supports a number of Internet access tools, including, for example, an HTTP-compliant web browser having a script interpreter, such as a JavaScript interpreter.

As explained above, the invention described herein can be implemented in a variety of computing and networking environments and is designed to facilitate communication between heterogeneous, incompatible devices and computer systems provided by multiple vendors. The invention enables enterprise data management application programs to request input/output services from a device manager controlling devices without requiring device-specific knowledge. Requests for services, and responses from the device manager to the enterprise data management application program, are communicated in a markup language format, rather than in a device-specific native language. This structure enables the vendor of the enterprise data management application program to send requests for services, including both data and instructions to use specialized features of a device, without the need to change the enterprise data management application program to support device-specific native languages.

By using a markup language format for communication, integration of new devices is straightforward. Testing for new devices involves ensuring that the message formats conform to the device markup language API request and response formats. Optional variables and values can be specified to take advantage of specific features of a particular device without requiring modification of software for other devices.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
    receiving a first request, wherein
        the first request is a request to provide a requested service,
        the requested service is one of a plurality of services,
        the first request conforms to a request format defined in a first language,
        the first request is received by a module configured to receive the first request from a plurality of source types, and
        the plurality of source types comprises
            an applet executing on a first remote network node, and
            a control module executing on a second remote network node;
    parsing the first request by providing the first request to a language parser, wherein
        the language parser is configured to parse the first language;
    obtaining results of parsing the first request from the language parser;
    in response to the obtaining the results, selecting a first device, wherein
        the selecting comprises
            determining whether the first device is coupled to the language parser, and
            in response to a determination that the first device is not coupled to the language parser,
                adding the first device to a plurality of devices coupled to the language parser; and coupling the first device to the language parser, wherein
the first device is configured to provide the requested service,
each of the plurality of devices is configured to provide a corresponding service of the plurality of services, and
at least two devices among the plurality of devices are configured to provide the requested service; and
converting the first request to a second request, wherein
the second request conforms to a request format defined in a second language,
the first device is configured to provide the requested service in response to receiving the second request,
a language-specific interface of each device of the plurality of devices is incompatible with a language-specific interface of each other device of the plurality of devices, and
the each other device of the plurality of devices are those devices of the plurality of devices other than the each device.

2. The method of claim 1, further comprising:
directing the second request to the first device.

3. The method of claim 2, wherein
the first language is a markup language, and
the second language is a device-specific language of a plurality of device-specific languages, wherein
each of the plurality of devices communicates using a corresponding one of the plurality of device-specific languages, and
each corresponding one of the plurality of device-specific languages corresponds to a one of a plurality of language-specific interfaces.

4. The method of claim 2, wherein the request formats comprise:
at least one instruction, and
data to be used when performing the at least one instruction.

5. The method of claim 4, further comprising:
specifying the use of a specific feature of the first device, wherein
the specifying the use of the specific feature comprises specifying an optional variable and providing a value for the optional variable, and
the converting the first request to the second request comprises
including the optional variable in the at least one instruction of the second request, and
including the value for the optional variable in the data of the second request.

6. The method of claim 1, further comprising:
sending a response to the first request, wherein
the response conforms to a response format defined in the first language.

7. The method of claim 6, wherein the response format comprises:
at least one instruction; and
data to be used when performing the at least one instruction.

8. The method of claim 1, wherein
the plurality of source types comprises a magnetic card reader.

9. The method of claim 1, further comprising:
receiving a third request to provide a second requested service, wherein
the third request conforms to the request format defined in the first language,
the receiving the third request is performed by the module,
providing the third request to the language parser;
obtaining results of parsing the third request from the language parser;
selecting a second device of the plurality of devices to provide the second requested service, wherein
the selecting the second device is performed in response to the obtaining the results of parsing the third request; and
converting the third request to a fourth request, wherein
the fourth request conforms to a request format defined in a third language,
the second device is configured to provide the second requested service in response to receiving the fourth request, and
at least one of the plurality of devices is configured to receive requests only in a format that is incompatible with the request format defined in the third language.

10. The method of claim 1, wherein the at least two devices configured to provide the requested service comprise:
the first device, wherein
the first device is configured to provide the requested service, and
the first device comprises a first application program interface (API) configured to receive instructions in a first device-specific native language; and
a second device, wherein
the second device is configured to provide the requested service,
the second device comprises a second API configured to receive instructions in a second device-specific native language,
the second device-specific native language is distinct from the first device-specific native language, and
the second device is configured to receive requests only in a format that is incompatible with the request format defined in the second language.

11. The method of claim 1, wherein the at least two devices configured to provide the requested service comprise:
the first device, wherein
the first device is produced by a first vendor; and
a second device, wherein
the second device is produced by a second vendor, and
the second vendor is distinct from the first vendor.

12. The method of claim 11, wherein
the second request conforms to requests generated using a dynamic link library (DLL) provided by the first vendor, and
the second device is incompatible with requests generated using the DLL provided by the first vendor.

13. The method of claim 1, wherein
at least one of the plurality of devices is configured to receive requests conforming only to another request format,
the another request format is defined in a third language, and
the second language and the third language are incompatible with one another.

14. A system comprising:
receiving means for receiving a first request, wherein
the first request is a request to provide a requested service,
the requested service is one of a plurality of services,
the first request conforms to a request format defined in a first language, the receiving means is configured to receive the first request from a plurality of source types, and
the plurality of source types comprises an applet executing on a first remote network node, and a control module executing on a second remote network node;
parsing means for parsing the first request, wherein
the parsing means is configured to parse the first language;
obtaining means for obtaining results from the parsing means;
selecting means, responsive to the obtaining means, for selecting a first device, wherein
the selecting means comprises
determining means for determining whether the first device is coupled to a language parser, and
in response to a determination that the first device is not coupled to the language parser,
adding means for adding the first device to a plurality of devices coupled to the language parser; and
coupling means for coupling the first device to the language parser, wherein
the first device is configured to provide the requested service,
each of the plurality of devices is configured to provide a corresponding service of the plurality of services, and
at least two devices among the plurality of devices are configured to provide the requested service; and
converting means for converting the first request to a second request, wherein
the second request conforms to a request format defined in a second language,
the first device is configured to provide the requested service in response to receiving the second request,
a language-specific interface of each device of the plurality of devices is incompatible with a language-specific interface of each other device of the plurality of devices, and
the each other device of the plurality of devices are those devices of the plurality of devices other than the each device.

15. The system of claim 14, further comprising:
directing means for directing the second request to the first device.

16. The system of claim 15, wherein the request formats comprise:
at least one instruction, and
data to be used when performing the at least one instruction.

17. The system of claim 16, further comprising:
first including means for including an optional variable in the at least one instruction of the second request; and
second including means for including a value of the optional variable in the data of the second request, wherein
the optional variable and the value specify use of a specific feature of the first device.

18. The system of claim 14, further comprising:
sending means for sending a response to the first request, wherein
the response conforms to a response format defined in the first language.

19. The system of claim 18, wherein the response format comprises:
at least one instruction; and
data to be used when performing the at least one instruction.

20. A non-transitory computer-readable storage medium comprising:
receiving instructions to receive a first request, wherein
the first request is a request to provide a requested service,
the first request conforms to a request format defined in a first language,
the receiving instructions are further configured to receive the first request from a plurality of source types, and
the plurality of source types comprises an applet executing on a first remote network node, and a control module executing on a second remote network node;
providing instructions for providing the first request to a language parser, wherein
the language parser is configured to parse the first language;
obtaining instructions for obtaining results of parsing the first request from the language parser;
selecting instructions for selecting, in response to the obtaining instructions obtaining the results, a first device, wherein
the selecting instructions comprise
determining instructions for determining whether the first device is coupled to the language parser, and
in response to a determination that the first device is not coupled to the language parser,
adding instructions for adding the first device to a plurality of devices coupled to the language parser; and
coupling instructions for coupling the first device to the language parser, wherein
the first device is configured to provide the requested service,
each of the plurality of devices is configured to provide a corresponding service of a plurality of services, and
at least two devices among the plurality of devices are configured to provide the requested service; and
converting instructions to convert the first request to a second request in a request format defined in a second language, wherein
the second request conforms to the second language,
the first device is configured to provide the requested service in response to receiving the second request,
a language-specific interface of each device of the plurality of devices is incompatible with a language-specific interface of each other device of the plurality of devices, and
the each other device of the plurality of devices are those devices of the plurality of devices other than the each device.

21. The non-transitory computer-readable storage medium of claim 20, further comprising:
directing instructions to direct the second request to the first device.

22. The non-transitory computer-readable storage medium of claim 21, wherein the request formats comprise:
at least one instruction, and
data to be used when performing the at least one instruction.

23. The non-transitory computer-readable storage medium of claim 22, further comprising:
   first including instructions to include an optional variable in the at least one instruction of the second request; and
   second including instructions to include a value of the optional variable in the data of the second request, wherein
      the optional variable and the value specify use of a specific feature of the first device.
24. The non-transitory computer-readable storage medium of claim 20, further comprising:
   sending instructions for sending a response to the first request, wherein
      the response conforms to a response format defined in the first language.
25. The non-transitory computer-readable storage medium of claim 24, wherein the response format comprises:
   at least one instruction; and
   data to be used when performing the at least one instruction.
26. A computer system comprising:
   a processor configured to execute instructions;
   a communications interface, coupled to the processor, wherein
      the communications interface is configured to allow a plurality of devices to be coupled to the computer system, and
      each device is configured to perform a corresponding service of a plurality of services; and
   a non-transitory computer-readable storage medium, coupled to the processor, and having the instructions encoded therein, wherein
      the instructions comprise
         receiving instructions for receiving a first request, wherein
            the first request is a request to receive a request to provide a requested service,
            the requested service is one of the plurality of services,
            the first request conforms to a request format defined in a first language,
            the receiving instructions are further configured to receive the first request from a plurality of source types,
            the plurality of source types comprises an applet executing on a first remote network node, and a control module executing on a second remote network node, and
            at least two devices of the plurality of devices provide the service;
         providing instructions for providing the first request to a language parser, wherein
            the language parser is configured to parse the first language;
         obtaining instructions to obtain results of parsing the first request from the language parser;
         identifying instructions for identifying, in response to the obtaining instructions obtaining the results, a first device, wherein
            the identifying instructions comprise
               determining instructions for determining whether the first device is coupled to the language parser, and
               in response to a determination that the first device is not coupled to the language parser,
                  adding instructions for adding the first device to a plurality of devices coupled to the language parser; and
                  coupling instructions for coupling the first device to the language parser, and
               the first device is configured to provide the requested service; and
         converting instructions to convert the first request to a second request in a second language, wherein
            the second request conforms to a request format defined in the second language,
            the first device is configured to provide the service in response to receiving the second request,
            a language-specific interface of each device of the plurality of devices is incompatible with a language-specific interface of each other device of the plurality of devices, and
            the each other device of the plurality of devices are those devices of the plurality of devices other than the each device.
27. The computer system of claim 26, wherein the instructions further comprise:
   directing instructions to direct the second request to the first device.
28. The computer system of claim 27, wherein the request format comprises:
   at least one instruction and
   data to be used when performing the at least one instruction.
29. The computer system of claim 28, wherein the instructions further comprise:
   first including instructions to include an optional variable in the at least one instruction of the second request; and
   second including instructions to include a value of the optional variable in the data of the second request, wherein
      the optional variable and the value specify use of a specific feature of the first device.
30. The computer system of claim 27, wherein the instructions further comprise:
   sending instructions for sending a response to the first request.
31. The computer system of claim 30, wherein
   the response conforms to a response format defined in the first language.
32. The computer system of claim 31, wherein
   the response format comprises:
      at least one instruction; and
      data to be used when performing the at least one instruction.
33. A system comprising:
   a receiving module configured to receive a first request, wherein
      the first request is a request to provide a requested service,
      the requested service is one of a plurality of services,
      the first request conforms to a request format defined in a first language,
      the receiving module is further configured to receive the first request from a plurality of source types,
      the plurality of source types comprises an applet executing on a first remote network node, and a control module executing on a second remote network node,
      at least two devices of a plurality of devices are configured to provide the service, and
      the plurality of devices is coupled to the system;

a language parsing module configured to parse the first language, wherein
  the first request is provided to the language parsing module;
an identifying module configured to identify a first device, wherein
  the identifying module comprises
    determining instructions for determining whether the first device is coupled to a language parser, and
    in response to a determination that the first device is not coupled to the language parser,
      adding instructions for adding the first device to a plurality of devices coupled to the language parser; and
      coupling instructions for coupling the first device to the language parser, and
  the first device is configured to provide the requested service; and
a converting module configured to convert the first request to a second request in a second language, wherein
  the second request conforms to a request format defined in the second language,
  the first device is configured to provide the service in response to receiving the second request,
  a language-specific interface of each device of the plurality of devices is incompatible with a language-specific interface of each other device of the plurality of devices, and
  the each other device of the plurality of devices are those devices of the plurality of devices other than the each device.

34. The system of claim 33, further comprising:
a directing module to direct the second request to the first device.

35. The system of claim 34, wherein the request formats comprise
at least one instruction, and
data to be used when performing the at least one instruction.

36. The system of claim 35, further comprising:
a first including module to include an optional variable in the at least one instruction of the second request; and
a second including module to include a value of the optional variable in the data of the second request, wherein
  the optional variable and the value specify use of a specific feature of the first device.

37. The system of claim 33, further comprising:
a sending module for sending a response to the first request, wherein
  the response conforms to a response format defined in the first language.

38. The system of claim 37, wherein
the response format comprises:
at least one instruction; and
data to be used when performing the at least one instruction.

* * * * *